(12) United States Patent
Li et al.

(10) Patent No.: US 10,834,741 B2
(45) Date of Patent: Nov. 10, 2020

(54) UPLINK RESOURCES FOR ULTRA-RELIABLE AND LOW LATENCY COMMUNICATION

(71) Applicant: NOKIA TECHNOLOGIES OY, Espoo (FI)

(72) Inventors: Zexian Li, Espoo (FI); Bikramjit Singh, Espoo (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/483,375

(22) PCT Filed: Feb. 3, 2017

(86) PCT No.: PCT/EP2017/052376
§ 371 (c)(1),
(2) Date: Aug. 2, 2019

(87) PCT Pub. No.: WO2018/141401
PCT Pub. Date: Aug. 9, 2018

(65) Prior Publication Data
US 2020/0015249 A1  Jan. 9, 2020

(51) Int. Cl.
*H04W 72/12* (2009.01)
*H04W 72/00* (2009.01)
*H04L 5/00* (2006.01)
*H04W 72/04* (2009.01)

(52) U.S. Cl.
CPC ..... *H04W 72/1236* (2013.01); *H04W 72/005* (2013.01); *H04W 72/0446* (2013.01); *H04W 72/1284* (2013.01)

(58) Field of Classification Search
None
See application file for complete search history.

(56) References Cited

U.S. PATENT DOCUMENTS 8,995,462 B2 * 3/2015 Kim ............... H04W 74/08
370/445
2017/0013610 A1   1/2017 Lee et al.

OTHER PUBLICATIONS

International Search Report and Written Opinion for Application No. PCT/EP2017/052376, dated Oct. 16, 2017, 21 pages.

(Continued)

*Primary Examiner* — Hong S Cho
(74) *Attorney, Agent, or Firm* — Brake Hughes Bellermann LLP

(57) ABSTRACT

To efficiently use uplink resources while fulfilling latency requirements of low latency services, an access node, a resource pool allocated for contention based transmissions of low latency communication services may be used for transmissions of data services, since an access node providing the resource pool, is caused to send, in response to not being able to decode terminal device identification information from a sensed scheduling request, a stop instruction to terminal devices that are using the resource pool to transmissions of the data services. Further, the terminal device that sent the scheduling request is caused to use the resource pool for transmissions of the low latency service if a response is not received within predetermined time.

24 Claims, 4 Drawing Sheets

(56) References Cited

OTHER PUBLICATIONS

3GPP TSG RAN WG1 AH_NR Meeting; R1-1700642; Agenda item: 5.1.3.4; Sequans Communications; "On Dynamic Resource Sharing Between URLLC and eMBB in DL"; Spokane, WA, USA; Jan. 16-20, 2017; 6 pages.
3GPP TSG-RAN WG1 NR AH; R1-1701024; Agenda item: 5.1.3.4; Nokia, Alcatel-Lucent Shanghai Bell; "Pause-Resume Scheduling for Low Latency Uplink Transmissions"; Spokane, WA, USA; Jan. 16-20, 2017; 5 pages.
3GPP TSG RAN WG1 NR Ad-Hoc Meeting; R1-1700377; Agenda item: 5.1.3.4; Intel Corporation; "Uplink Multiplexing of eMBB and URLLC Transmissions"; Spokane, WA, USA; Jan. 16-20, 2017; 8 pages.
3GPP TSG-RAN WG2 NR-AH; R2-1700436; Agenda Item: 3.2.1.2; Ericsson; "URLLC Aspects for Contention Based UL Transmission in NR"; Spokane, Washington, USA; Jan. 17-19, 2017; 5 pages.

\* cited by examiner

UPLINK RESOURCES FOR ULTRA-RELIABLE AND LOW LATENCY COMMUNICATION

CROSS-REFERENCE TO RELATED APPLICATIONS

This application is a national stage entry of International Application No. PCT/EP2017/052376 filed Feb. 3, 2017, entitled "UPLINK RESOURCES FOR ULTRA-RELIABLE AND LOW LATENCY COMMUNICATION" which is hereby incorporated by reference in its entirety.

TECHNICAL FIELD

The invention relates to wireless communications in a cellular communication system.

BACKGROUND

In recent years the phenomenal growth of mobile services and proliferation of smart phones and tablets have increased a demand for higher network capacity. Future wireless networks, such as the 5th Generation, 5G, is envisaged to expand and support diverse usage scenarios and applications with respect to current mobile network generations. One of the scenarios for 5G is ultra-reliable low latency communications with strict requirements, especially in terms of latency and reliability. However, since there will be also other services, such as enhanced mobile broadband with high data rate requirements, one challenge is how to efficiently use uplink resources.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

Figure 1:
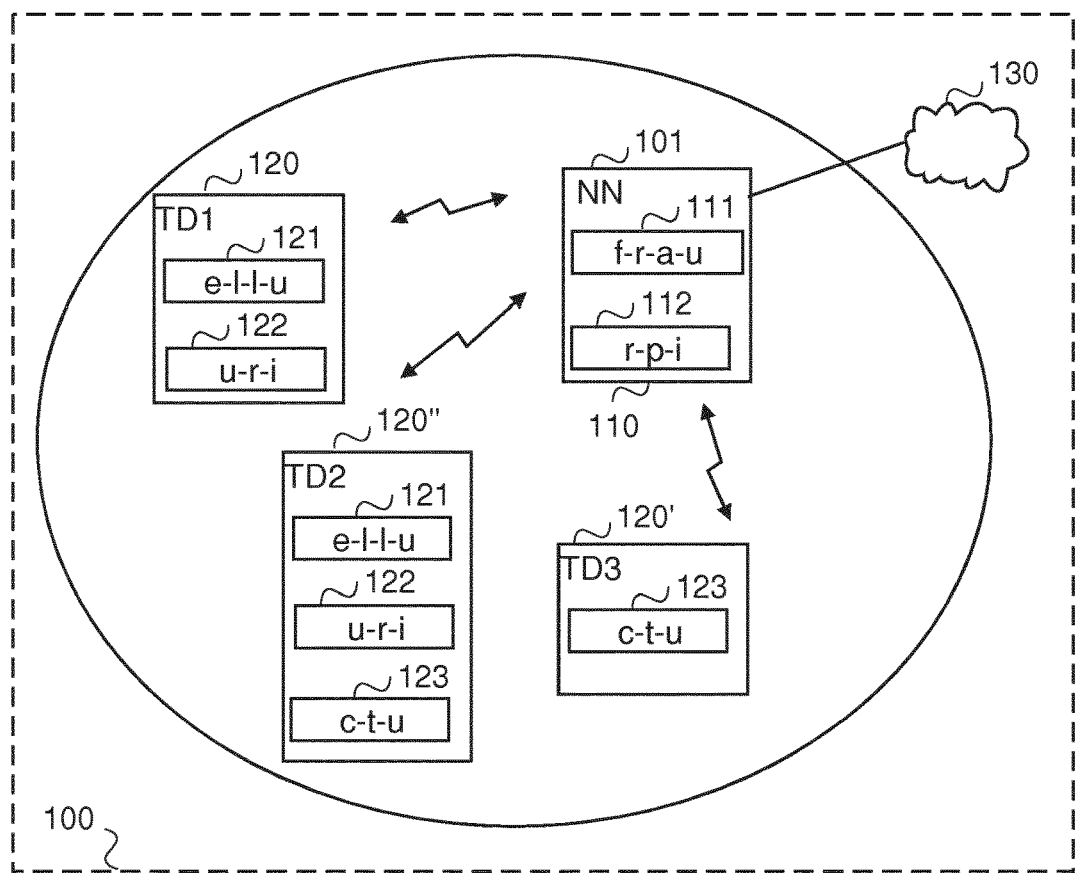
FIG. 1 illustrates an exemplified wireless communication system.

The following embodiments are exemplifying. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system including a wireless system, such as in at least one of the following: high-speed packet access (HSPA), Long Term Evolution (LTE), LTE-Advanced, LTE-Advanced Pro, fifth generation (5G) system, beyond 5G, and/or wireless local area networks (WLAN) based on IEEE 802.11 specifications on IEEE 802.15 specifications. The embodiments are not, however, restricted to the systems given as an example but a person skilled in the art may apply the solution to other communication systems provided with necessary properties. One example of a suitable communications system is the 5G system, as listed above, and especially 5G new radio (NR) system.

5G has been envisaged to use multiple-input-multiple-output (MIMO) multi-antenna transmission techniques, more base stations or access nodes than the current network deployments of LTE, by using a so-called small cell concept including macro sites operating in co-operation with smaller local area access nodes, such as local ultra-dense deployment of small cells, and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cm Wave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cm Wave and mm Wave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed. For example, one or more of the below described access node (base station) functionalities may be migrated to any corresponding abstraction or apparatus or device. Therefore, all words and expressions should be interpreted broadly and they are intended to illustrate, not to restrict, the embodiment.

An extremely general architecture of an exemplifying system 100 to which embodiments of the invention may be applied is illustrated in FIG. 1. FIG. 1 is a simplified system architecture only showing some elements and functional entities, all being logical units whose implementation may differ from what is shown. It is apparent to a person skilled in the art that the system may comprise any number of the illustrated elements and functional entities.

Referring to FIG. 1, a cellular communication system 100, formed by one or more cellular radio access networks, such as the Long Term Evolution (LTE), the LTE-Advanced (LTE-A) of the 3rd Generation Partnership Project (3GPP), or the predicted future 5G solutions, is composed of a radio access network of access nodes 110, each controlling a respective cell 101 or cells, thereby providing terminal devices 120, 120', 120" with wireless access to other networks 130 such as the Internet. The cell 101 may be a macro cell, a micro cell, femto, or a pico cell, for example. From another point of view, the cell 101 may define a coverage area or a service area of the access node 110.

The access node 110 may be an evolved Node B (eNB) as in the LTE and LTE-A, an access point of an IEEE 802.11-based network (Wi-Fi or wireless local area network, WLAN), or any other apparatus capable of providing one or more cells, controlling radio communication and managing radio resources within the one or more cells. For 5G solutions, the implementation may be similar to LTE-A. In some scenarios, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided. To provide efficient usage of uplink resources to terminal devices using different services and sharing the same uplink resource while maintaining the tight latency requirements of the ultra-reliable and low latency communication (URLLC) services, or any corresponding low latency services, the access node 110 comprises a flexible resource allocation unit (f-r-a-u) 111 and in a memory 112 at least resource pool information (r-p-i). The resource pool information contains information on resources that are reserved for contention based transmissions of terminal devices using a low latency service, such as ultra-reliable low latency communication (URLLC). Below term "URLLC service" is used as an example of a low latency service without restricting the examples to mere URLLC services, Further, below the resources that are reserved for contention based transmissions of terminal devices using a low latency service are called simply "resource pool", "contention resource pool" or "resource pool for contention based URLLC". Examples of different functionalities of the flexible resource allocation unit 111 will be described in more detail below. The access node 110 may be called a base station (BS) or a network node or a transmission point, and below the term "base station" is used.

The terminal device (TD) 120, 120', 120" refers to a portable computing device (equipment, apparatus), and it may also be referred to as a user device, a user terminal or a mobile terminal or a machine-type-communication (MTC) device, also called Machine-to-Machine device and peer-to-peer device. Such computing devices (apparatuses) include wireless mobile communication devices operating with or without a subscriber identification module (SIM) in hardware or in soft-ware, including, but not limited to, the following types of devices: mobile phone, smart-phone, personal digital assistant (PDA), handset, laptop and/or touch screen computer, e-reading device, tablet, game console, notebook, multimedia device, sensor, actuator, video camera, car, refrigerator, other domestic appliances, telemetry appliances, and telemonitoring appliances.

Two of the three terminal devices 120, 120', 120" illustrated in FIG. 1 are configured to support the efficient usage of uplink resources to terminal devices using different services and sharing the same uplink resource while maintaining the tight latency requirements of low latency services, such as URLLC services. For that purpose the terminal devices 120, 120" each comprises an enhanced low latency service unit (e-l-l-u) 121 configured to store at least temporarily to memory 122 uplink resource information (u-r-i) for the URLLC service at least when the URLLC service is in use. Examples of different functionalities of the enhanced low latency service unit and the uplink resource information for the URLLC will be described in more detail below as part of the terminal device functionality. Further, two of the three terminal devices 120, 120', 120" are configured to support for data services, such as eMBB, or other high data rate services not having so strict latency and reliability requirements, data transmission on resource pool for contention based URLLC when the resource pool is not needed for URLLC. For that purpose the terminal devices 120', 120" each comprises a contention transmission unit (c-t-u) 123. Examples of different functionalities of the contention transmission unit will be described in more detail below. It should be appreciated that the enhanced low latency service unit and the contention transmission unit may be integrated together. Further, although terminal devices of three different types, i.e. with three different capability sets comprising terminal device 120 supporting low latency services (URLLC), terminal device 120' supporting data services (eMBB) and terminal device 120" supporting both services, are depicted, that need not to be the case. For example, the system may comprise only terminal devices supporting both services (depicted by TD2), or any other combinations of the different terminal device type.

Figure 2:
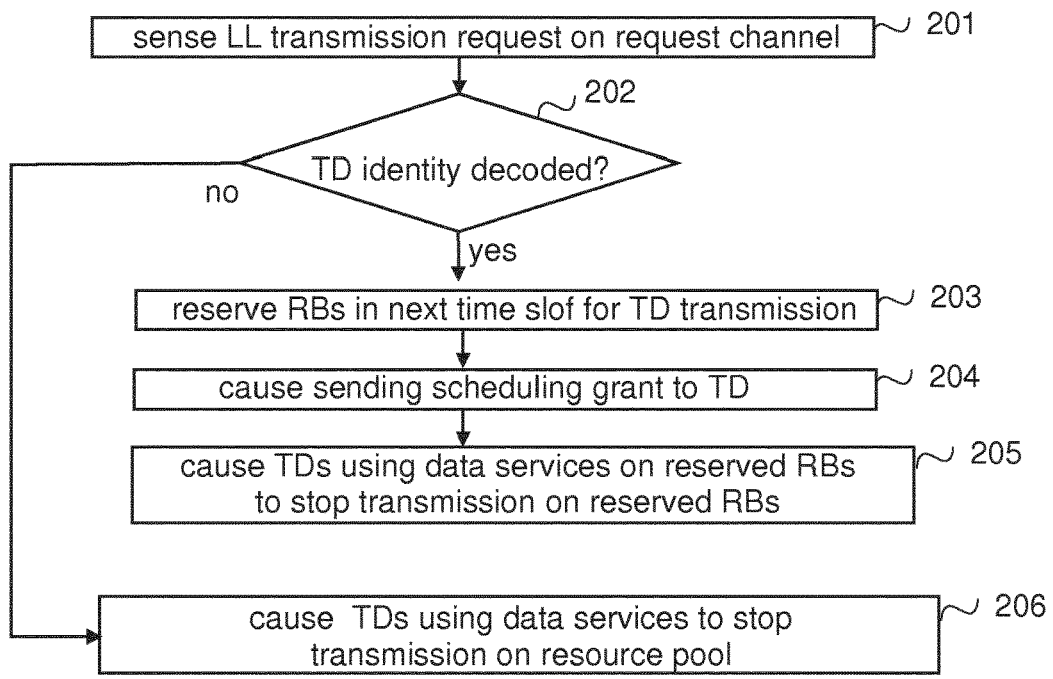
FIGS. 2 to 5 illustrate exemplified processes.

FIG. 2 is a flow chart illustrating an exemplified basic functionality of a base station, or more precisely basic functionality of the flexible resource allocation unit. In the illustrated example it is assumed that a dedicated resource for terminal devices using the URLLC service to send scheduling requests has been allocated and is known by the base station.

Referring to FIG. 2, when a low latency (LL) scheduling request, or more precisely URLLC transmission scheduling request is sensed in block 201 on the dedicated resource for transmissions of scheduling requests and a terminal device (TD) identity of the requesting terminal device is decoded (block 202: yes), required resources, i.e. required amount of resource blocks (RBs), in the next time slot is received in block 203 for the terminal device and then sending a resource grant to the terminal device is caused in block 204.

Further, terminal devices using data services, such as terminal devices using enhanced mobility broadband services (eMBB), on reserved resources overlapping the resources reserved in block 203, to stop transmission on the resources reserved in block 203 for URLLC transmission is caused in block 205 to prioritize the URLLC transmission. In other words, already allocated resource(s) for data services (for eMBB services, for example) are taken back for URLLC usage.

However, if the terminal device (TD) identity of the requesting terminal device is not decoded (block 202: no), the base station cannot grant a dedicated resource since it does not know the identity to whom to allocate dedicated resource. Reasons why decoding may fail include external interference and deep fading, for example. Still a further possibility is that there are multiple resource requests from different terminal devices using URLLC and the requests collide. Because of the decoding failing, terminal devices using the data services, such as the enhanced mobility broadband services (eMBB), to stop transmission on resources that are in a contention resource pool reserved for URLLC in the base station is caused in block 206. Hence, by sending the instruction to stop, it is ensured that no collision should take place with transmissions of terminal devices using eMBB, since such transmissions are temporarily stopped. That in turns makes it possible to provide shared resources for URLLC services even when decoding fails, and therefore dedicated resources cannot be allocated. However, thanks to the stop request, the resources can be used by terminal devices using eMBB, or other data service, when there are no terminal devices using the resources for URLCC. Depending on an implementation, the system may be configured to use a preset value, for example one time slot, for how long the stop request is valid, in which case no further communication is needed, or the base station may be configured to inform the terminal devices using eMBB, or other data service, when they can continue using the contention resource pool. The latter implementation is illustrated in FIG. 12.

While continuously monitoring/sensing the dedicated resource for terminal devices using the URLLC service to send scheduling request, the terminal devices need to be informed on the dedicated resource and on the resource pool. The resource pool may be implemented as a static resource pool, or as a dynamic resource pool.

Figure 3:
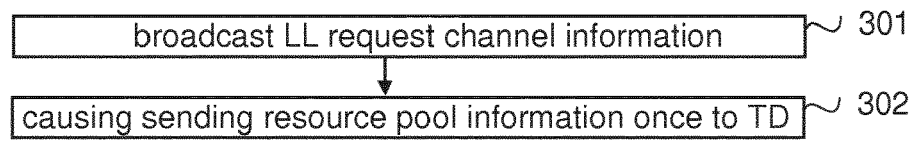
Figure 4:
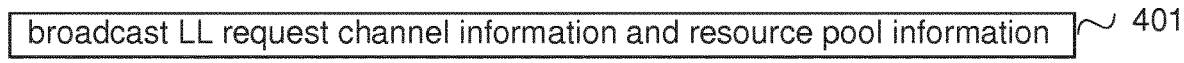
Figure 12:
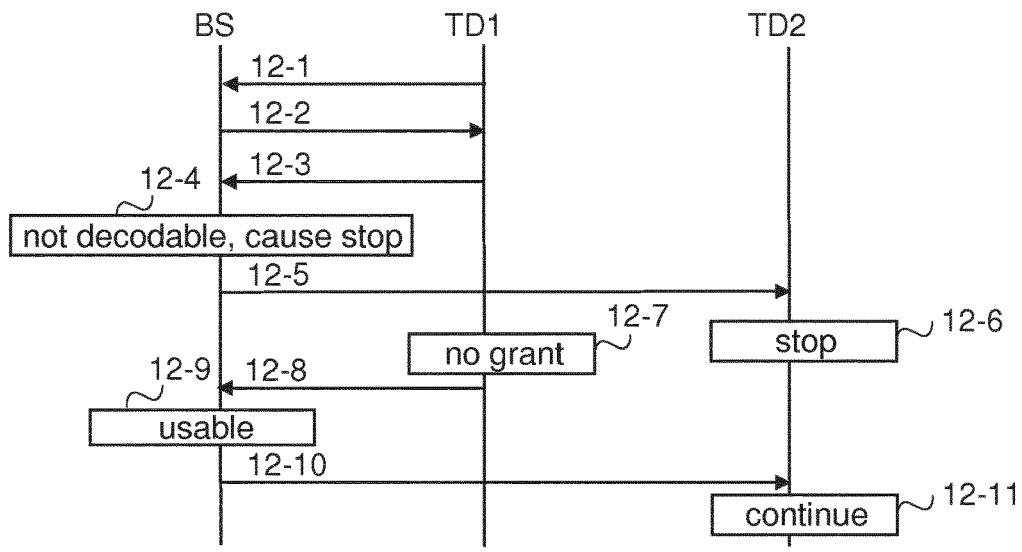
FIG. 12 illustrate exemplified information exchange.

Different possibilities to convey the information on the dedicated resource for scheduling requests and on the resource pool, are illustrated in FIGS. 3, 4 and 12.

Referring to FIG. 3, the base station broadcast (block 301) at regular intervals information on the dedicated resource for terminal devices using the URLLC service to send scheduling request. Further, when a static pool is used, it suffices that the terminal device is informed on it only once. Therefore sending information on the resource pool for contention based URLLC uplink transmissions is caused in block 302 once to each terminal device. This may take place during a connection set up, or during a handover, to the cell/base station.

FIG. 4 illustrates another way to convey the information which can be used both for static resource pools and dynamic resource pools. Referring to FIG. 4, the base stations broadcast (block 401) at regular intervals both information on the dedicated resource for terminal devices using the URLLC service to send scheduling request and information on the resource pool for contention based URLLC uplink transmissions.

Further alternatives how to convey the information on the resource pool (dynamin or static) include multicasting or unicasting the information on the resource pool at regular intervals. Still another alternative includes that the terminal device may request information on the resource pool, as illustrated in FIG. 12.

Figure 5:
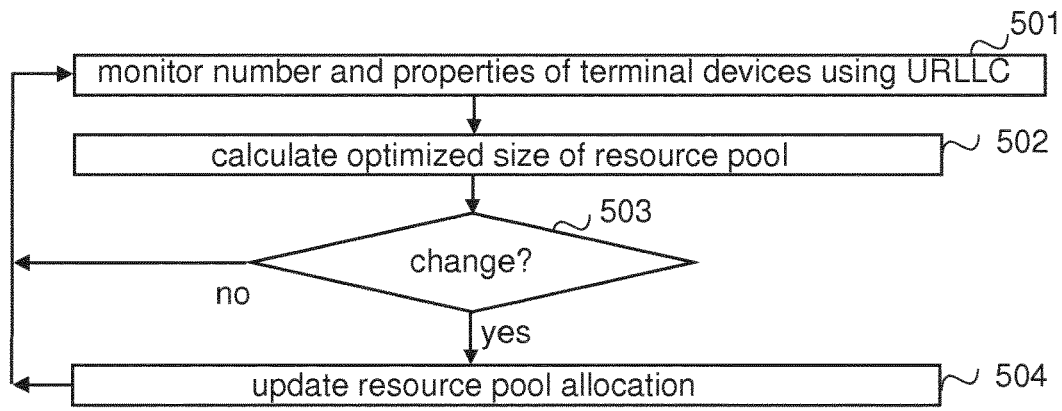

FIG. 5 is a flow chart illustrating an exemplified functionality of a base station, or more precisely basic functionality of the flexible resource allocation unit for dynamically reserving resource pools.

Referring to FIG. 5, information including a number of terminal devices using URLLC and their properties, such as traffic patterns etc., is monitored in block 501, and the monitored information is utilized to calculate in block 502 an optimized size of the resource pool. For example, a process similar to the process described in patent application PCT/EP2016/072662, which is incorporated herein by reference in its entirety, may be used.

Another example is as follows. In the example it is assumed that the base station allocates one frequency resource unit for scheduling requests (i.e. for the request channel) from terminal devices using the URLLC service, and that each terminal device using the URLLC service has an independent Poisson packet arrival with average number of packet arrivals in an interval μ (packet arrival rate). Further, it is assumed that the URLLC packet size is one resource block (RB) in one transmission time interval (TTI), i.e. the size of 1 RB×1 TTI. There are two types of collisions in this scenario: collisions of scheduling requests and collisions of data transmissions. Multiple terminal devices using URLLC service may send scheduling requests at the same time and this may result in collisions of scheduling requests. Multiple terminal devices using URLLC service may send their data on the resource pool at the same time and this may result in collisions of data transmissions. Following formula may be used for the probability of collisions of data transmissions:

$$P_{c2} = 1 - \left(\frac{e^{-\mu} + K - 1}{K}\right)^{N-1} \quad (1)$$

wherein
$P_{c2}$=probability of collisions of data transmissions
μ=packet arrival rate
K=number of units (or resource blocks in one transmission time interval) reserved for the contention resource pool
N=number of served terminal devices using URLLC
To obtain the probability of collisions of scheduling requests, K is set to be 1 in the formula (1), and then the overall collision probability may me defined as follows:

$$P_c = P_{c1} \cdot P_{c2} \quad (2)$$

wherein
$P_c$=overall probability of collisions
$P_{c1}$=probability of collisions of scheduling requests
$P_{c2}$=probability of collisions of data transmissions
The overall probability of collisions should be smaller or equal to a collision rate target for URLLC. Setting the overall probability of collisions to be the same as collision rate target for URLLC service to the formula (2), and to use the formula (2) to solve the value of the probability of collisions of scheduling requests, and then setting the result to the formula (1), following formula for optimized amount of resource pool, i.e. a number of units K to be reserved for the contention resource pool is obtained:

$$K = \frac{1 - e^{-\mu}}{1 - \left(1 - \frac{P_c^{target}}{1 - e^{-\mu(N-1)}}\right)^{1/N-1}} \quad (3)$$

wherein

K=number of units (or resource blocks in one transmission time interval) reserved for the contention resource pool, conforming the collision rate under the URLLC collision bound μ=packet arrival rate $P_c^{target}$=collision rate target for URLLC N=number of served terminal devices using URLLC When the optimized size has been calculated, it is checked in block 503, whether there is any change in the size. In other words, using the above example, it is checked whether the value K has changed. If it has (block 503: yes), the resource pool allocation is updated in block 504 correspondingly, and the process returns to block 501 to monitor the information on terminal devices using URLLC services. If there is no change (block 503: no), the process returns to block 501 to monitor the information on terminal devices using URLLC services.

It should be appreciated that other ways to determine the dynamic resource pool may be used, and the resource allocation for the resource pool may be changed also for other reasons.

Further, it should be appreciated that although the monitoring continues all the time, the calculation may be triggered at certain intervals and/or when the number of terminal devices using URLLC service has changed more than a preset limit, for example.

Examples of the resource pools are illustrated in FIGS. 6 to 9. The dedicated (reserved) resources indicated in grant, if the decoding succeeds, will be one or more of the resource blocks depicted as eMBB data resource blocks in FIGS. 6 to 9. The resource pool allocations illustrated are those resources the terminal device may use if no response with resource grant to the depicted request is received. The resources may be used, when not reserved for URLLC service for contention based data transmissions (data traffic), for transmissions of data service data, such as eMBB data, or for any other scheduling based transmissions.

Figure 6:
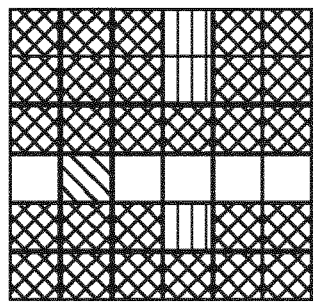
FIGS. 6 to 9 illustrate different resource reservation examples.

FIG. 6 illustrates an example of a static resource pool allocation with three resource blocks in a relative third TTI (transmission time interval) to a sensed URLLC transmission scheduling request.

Figure 7:
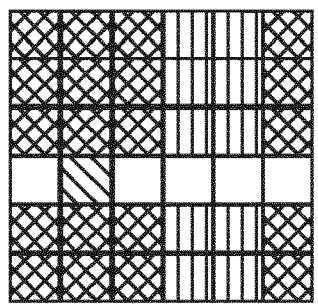

FIG. 7 illustrates another example of a static resource pool allocation with 10 resource blocks spanned over two TTIs, i.e. over the relative third TTI to a sensed URLLC transmission scheduling request and a relative fourth TTI to a sensed URLLC transmission scheduling request.

Figure 8:
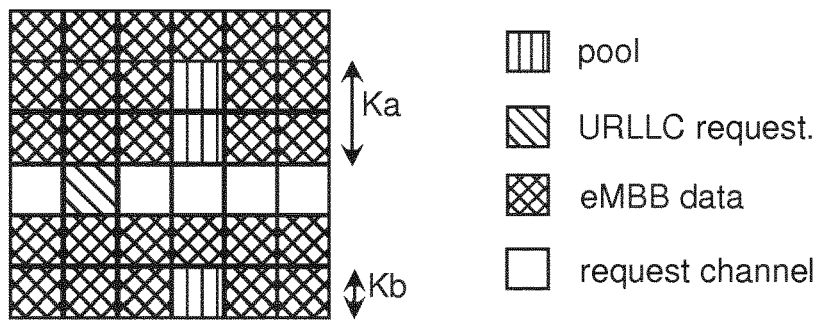

FIG. 8 illustrates an example of a dynamic resource pool allocation with K resource blocks, the K being a sum of Ka and Kb, optimized at regular intervals, for example. The optimization may use principles of described above with FIG. 5, or described in patent application PCT/EP2016/072662.

Figure 9:
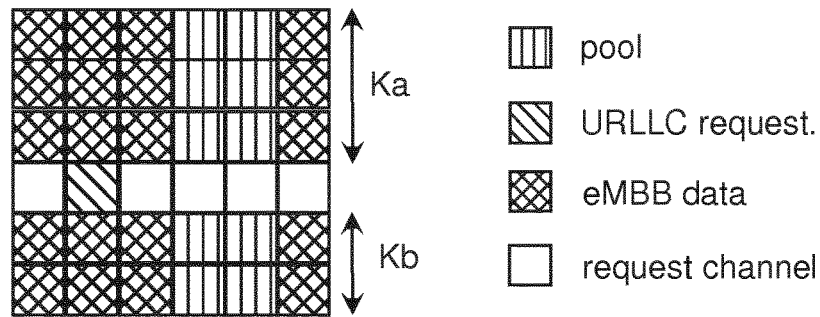

FIG. 9 illustrates another example of a dynamic resource pool allocation with K resource blocks and transmission diversity of two, the K being a sum of Ka and Kb, optimized as described above.

Figure 10:
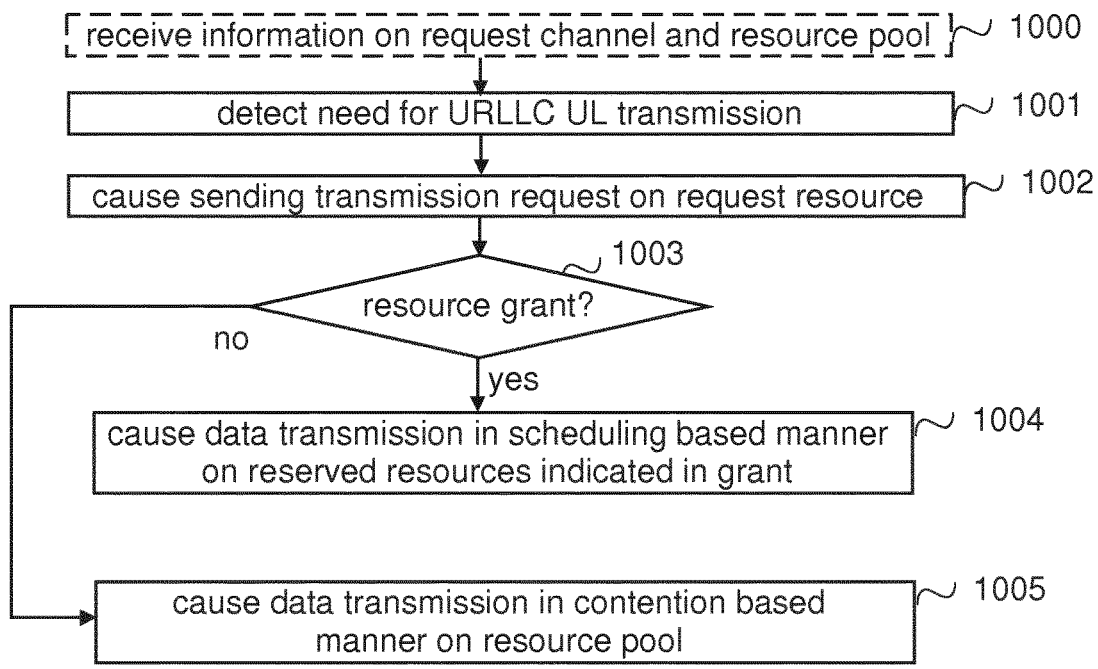
FIGS. 10 and 11 illustrate exemplified processes.

FIG. 10 is a flow chart illustrating an exemplified basic functionality of a terminal device using URLLC service, or more precisely basic functionality of the enhanced low latency service unit. Further, it is assumed that the terminal device has received in block 1000 (and stored temporarily) the latest information on the dedicated resource for terminal devices using the URLLC service to send scheduling request and information on the resource pool for contention based URLLC uplink transmissions, received either as described above with FIG. 3 or FIG. 4, or as will be described with FIG. 12.

When a need for URLLC uplink (UL) transmission is detected in block 1001, sending a scheduling request on the dedicated resource is caused in block 1002. If a response with a resource grant indicating reserved resource is received within a time period a response is waited for (block 1003: yes) uplink data transmission is caused in block 1004 using the reserved dedicated resource that are reserved for this uplink data transmission. In other words, data transmission in scheduling based manner, using dedicated resources is used. The time period the response is waited for depends on implementation, such as used system and/or configuration, and is preset to terminal devices and to base station. In other words, the time period is known by the terminal devices and the base stations beforehand. For example, with 5G self-contained subframe the time period may be one subframe meaning only 0.125 ms.

However, if the response with resource grant is not received within the time period (block 1003: no), instead of causing resending of the request, possibly after a backoff period, uplink data transmission is caused in block 1005 in contention based manner on the resource pool. Thanks to that, the low latency requirements can be met. If the reason for not receiving the resource grant is a collision of requests, a deep fade due to shadowing or fast fading, or external interference, if the request for resource would be resent, most probably its decoding would likely fail, which in turn would increase the latency more. That is avoided by using the contention based transmission on the resource pool. Since the base stations stops use of the resource pool for terminal devices using the resource pool for data service, such as eMBB, temporarily, a probability to a collision is minimized.

To summon up, the terminal device is able to transmit the data using either dedicated or shared resource at a first attempt thereby ensuring the low latency.

Figure 11:
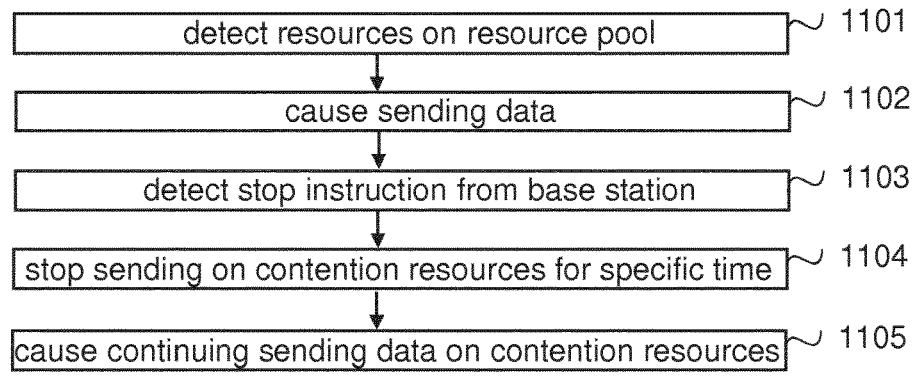

FIG. 11 is a flow chart illustrating an exemplified basic functionality of a terminal device using data service, or more precisely basic functionality of the contention transmission unit. In the illustrated example it is assumed that the terminal device will continue using the data service, such as eMBB service. In the example it is illustrated that the terminal device knows the resource pool because the base station broadcast information on resource pool, or the resource pool is indicated separately to the terminal device, for example a resource grant may indicate what part of the reserved resources are on the resource pool. However, it should be appreciated that if the instruction to stop is sent with information directly indicating the resources that are not to be used, the below described step 1101 will be skipped over.

Referring to FIG. 11, it is detected in block 1101 that at least part of the dedicated resources reserved for data transmission for the terminal device are on the resource pool. Despite that sending data when there is data to be sent on the reserved resources is caused in block 1102 until an instruction from a base station is detected in block 1103, the instruction instructing to stop sending on the resource pool. Upon detecting the instruction, sending data on reserved resources that are on the resource pool is stopped in block 1103 for a specific time. The specific time may be one transmission time interval, or two transmission time intervals, or a time between receiving the instruction to stop and receiving permission to continue, for example. When the specific time has lapsed, continuing sending data on the earlier reserved resources on the resource pool is caused in block 1104. If all reserved (granted, allocated) resources are on the resource pool, all data transmission is stopped in block 1103. However, if only part of the reserved resources are on the resource pool, the data transmission may continue all the time over the resources that are not on the resource pool.

FIG. 12 illustrates an exemplified information exchange in an exemplary situation.

Referring to FIG. 12, a terminal device TD1 using an URLLC service is configured to request information on the resource pool. The reason why the information is requested may be any possible reason and it does not necessarily depend on whether or not the information on the resource pool is broadcast. For example, an error may have happened when the terminal device TD1 tried to store the information. Further examples include that the terminal device is performing a handover, or starts to use, for example registers to, an URLLC service, or the system implements dynamic allocation without broadcasting, and the terminals using the URLLC service are configured to ask for the information at certain intervals and/or upon sensing that the resource pool has changed. Therefore the terminal device TD1 send message 12-1 to a serving base station BS, the message requesting information on the resource pool. The base station BS responds by sending information on the resource pool in message 12-2.

After some time, or immediately after receiving information on the resource pool, the terminal device TD1 sends URLLC transmission scheduling request in message 12-3. The base station BS senses the request but the identity information is not decodable (point 12-4), and therefore the base station instructs, or causes (point 12-4) terminal devices having reserved resources on the resource pool to data services to stop use of the resource pool so that the resource pool can be used for URLLC transmission. The instruction may be "hold", for example, This instruction is sent in message 12-5 to a terminal device TD2 depicting in FIG. 12 one or more terminal devices using the resource pool to data services, such as eMBB. Depending on an implementation, message 12-5 may be a broadcast message, multicast message or unicast message. For example, the base station may be configured to monitor the number of terminal devices that uses resources on the resource pool for scheduling-based data transmissions, i.e. for data services, and to select the way how to inform (broadcast, multicast, unicast) based on the number. Another alternative includes that the base station is configured to use one of broadcast, multicast, unicast regardless of the number. In broadcast and multicast, the terminal device, or more precisely, the contention transmission unit, is configured to detect when the resource pool is used, and further configured to detect when the instruction is for the terminal device.

Upon receiving message 12-5, the terminal device TD2 stops in point 12-6 sending data on the resource pool.

Meanwhile the terminal device TD1 detects (point 12-7) that no grant is received and therefore sends data on the resource pool (illustrated by message 12-8). Depending on an implementation, message 12-8, or a corresponding message sent after data, may also contain a new scheduling request in case the terminal device TD1 has more low latency service data packets to transmit.

When data is not anymore received, and/or a predetermined time has lapsed from sensing the request or sending instruction to stop, the base station determines in point 12-9 that the resource pool is again usable for data service transmissions (data service traffic), and sends corresponding information, for example a permission or an instructions or a new resource grant to continue the use of the resource pool for data service transmissions, in message 12-10 to the terminal devices using data services, i.e. in the illustrated example to the terminal device TD2.

Upon receiving the information in message 12-10, the terminal device TD2 continues using the resource pool for data services.

The blocks, points, related functions, and information exchanges described above by means of FIGS. 2 to 6 and 10 to 12 are in no absolute chronological order, and some of them may be performed simultaneously or in an order differing from the given one. Other functions can also be executed between them or within them, and other information may be sent. Some of the blocks or part of the blocks or one or more pieces of information can also be left out or replaced by a corresponding block or part of the block or one or more pieces of information.

The techniques and methods described herein may be implemented by various means so that an apparatus, i.e. a base station(access node)/terminal device, configured to support flexible use resources that are reserved for contention based transmissions of terminal devices using ultra-reliable low latency communication based on at least partly on what is disclosed above with any of FIGS. 1 to 12, including implementing one or more functions/operations of a corresponding base station or terminal device described above with an embodiment/example, for example by means of any of FIGS. 2 to 6 and 10 to 12, comprises not only prior art means, but also means for implementing the one or more functions/operations of a corresponding functionality described with an embodiment, for example by means of any of FIGS. 2 to 6 and 10 to 12, and it may comprise separate means for each separate function/operation, or means may be configured to perform two or more functions/operations. For example, one or more of the means and/or the flexible resource allocation unit and/or the enhanced low latency service unit and/or the contention transmission unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, logic gates, other electronic units designed to perform the functions described herein by means of FIGS. 1 to 12, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 13:
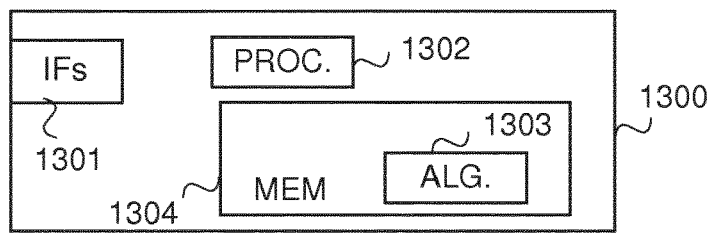
FIGS. 13 and 14 are schematic block diagrams.
Figure 14:
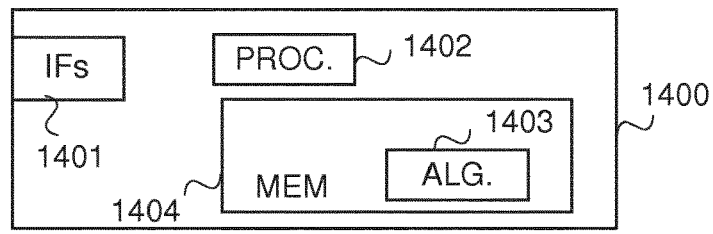

FIGS. 13 and 14 provide apparatuses according to some embodiments of the invention. FIG. 13 illustrates an apparatus configured to carry out the functions described above in connection with a base station. FIG. 14 illustrates an apparatus configured to carry out the functions described above in connection with the terminal device. Each apparatus may comprise one or more communication control circuitry, such as at least one processor 1302, 1402, and at least one memory 1304, 1404 including one or more algorithms 1303, 1403, such as a computer program code (software) wherein the at least one memory and the computer program code (software) are configured, with the at least one processor, to cause the apparatus to carry out any one of the exemplified functionalities of each respective apparatus.

The memory 1304, 1404 may be implemented using any suitable data storage technology, such as semiconductor based memory devices, flash memory, magnetic memory devices and systems, optical memory devices and systems, fixed memory and removable memory. The memory may store one or more preset rules described above.

The apparatus may further comprise different interfaces 1301, 1401 such as one or more communication interfaces (TX/RX) comprising hardware and/or software for realizing communication connectivity according to one or more communication protocols. The communication interface may provide the apparatus with communication capabilities to communicate in the cellular communication system and enable communication between different network nodes and between the terminal device and the different network nodes, for example. The communication interface may comprise standard well-known components such as an amplifier, filter, frequency-converter, (de)modulator, and encoder/decoder circuitries and one or more antennas. The communication interfaces may comprise radio interface components providing the base station and the terminal device with radio communication capability in the cell. Further, the apparatus 1400 may comprise one or more user interfaces (not depicted separately), such as a screen, microphone and one or more loudspeakers for interaction with the user.

Referring to FIG. 13, at least one of the communication control circuitries in the apparatus 1300 is configured to provide the flexible resource allocation unit, or any corresponding sub-unit, and to carry out functionalities described above by means of any of FIGS. 2 to 9 and 12 by one or more circuitries Referring to FIG. 14, at least one of the communication control circuitries in the apparatus 1400 is configured to provide at least one of the enhanced low latency service unit and the contention transmission unit, or any corresponding sub-unit, or any combinations of corresponding units, and to carry out functionalities described above by means of any of FIGS. 10 to 12 by one or more circuitries.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a terminal device or a similar integrated circuit in a base station, or another net-work device.

In an embodiment, the at least one processor, the memory, and the computer program code form processing means or comprises one or more computer program code portions for carrying out one or more operations according to any one of the examples of FIGS. 2 to 6 and 10 to 12 or operations thereof.

Embodiments as described may also be carried out in the form of a computer process defined by a computer program or portions thereof. Embodiments of the methods described in connection with FIGS. 2 to 6 and 10 to 12 may be carried out by executing at least one portion of a computer program comprising corresponding instructions. The computer program may be in source code form, object code form, or in some intermediate form, and it may be stored in some sort of carrier, which may be any entity or device capable of carrying the pro-gram. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
sensing, by an access node, on a channel allocated for transmissions of scheduling requests for a low latency communication service, a scheduling request from a terminal device; and
causing, in response to not being able to decode terminal device identification information from the scheduling request, sending from the access node to one or more terminal devices, which are using a resource pool allocated for contention based transmissions of low latency communication services to transmissions of data services, an instruction to stop use of the resource pool.

2. A method as claimed in claim 1, further comprising causing sending from the access node to the one or more terminal devices a permission to use again the resource pool to transmissions of the data services.

3. A method as claimed in claim 1, further comprising:
broadcasting, by the access node, at certain intervals information on the channel allocated for transmissions of scheduling requests for low latency communication services; and
causing sending information on the resource pool separately to each terminal using a low latency service.

4. A method as claimed in claim 1, further comprising broadcasting, by the access node, at certain intervals information on the channel allocated for transmissions of scheduling requests for low latency communication services and information on the resource pool.

5. A method as claimed in claim 1, further comprising:
monitoring, by the access node, information on terminal devices using the low latency communication services, the monitored information including a number of the terminal devices and their properties; and
updating, based on the monitored information, a size of resources allocated to the resource pool.

6. A method as claimed in claim 1, wherein the low latency communication services are ultra-reliable and low latency communication services.

7. A method as claimed in claim 1, wherein the data services are high data rate services.

8. A method as claimed in claim 7, wherein the high data rate services are enhanced mobility broadband services.

9. A method comprising:
causing sending from a terminal device on a channel allocated for transmissions of scheduling requests for low latency communication services, a transmission of a scheduling request for a low latency communication service;
causing, in response to not receiving a response to the scheduling request within a predetermined time, sending data in a contention based manner over a resource pool allocated for contention based transmissions of the low latency communication services.

10. A method comprising:
causing, in response to receiving in a terminal device using for transmissions of a data service a resource pool allocated for contention based traffic for transmissions of low latency communication services, from an access node providing the resource pool, an instruction to stop the use of the resource pool to transmissions of the data service, stopping the use of the resource pool to transmissions of the data service; and
causing, in response to one of a lapse of a predetermined time and receiving from the access node a permission to continue the use of the resource pool, sending transmission of the data service using the resource pool.

11. A method as claimed in claim 9, further comprising receiving, by the terminal device, information on the resource pool over a broadcast from the access node and/or in information sent separately to the terminal device from the access node.

12. An access node comprising:
at least one processor, and
at least one memory comprising a computer program code, wherein the processor, the memory, and the computer program code are configured to cause the access node to:
sense on a channel allocated for transmissions of scheduling requests for a low latency communication service, a scheduling request from a terminal device;
send, in response to not being able to decode terminal device identification information from the scheduling request, to one or more terminal devices, which are using a resource pool allocated for contention based transmissions of low latency communication services to transmissions of data services, an instruction to stop use of the resource pool.

13. An access node as claimed in claim 12, wherein the processor, the memory, and the computer program code are further configured to cause the access node to send to the one or more terminal devices a permission to use again the resource pool to transmissions of the data services.

14. An access node as claimed in claim 12, wherein the processor, the memory, and the computer program code are further configured to cause the access node to:
broadcast at certain intervals information on the channel allocated for transmissions of scheduling requests for low latency communication services; and
send information on the resource pool separately to each terminal using a low latency service.

15. An access node as claimed in claim 12, wherein the processor, the memory, and the computer program code are further configured to cause the access node to broadcast at certain intervals information on the channel allocated for transmissions request for low latency communication services and information on the resource pool.

16. An access node as claimed in claim 12, wherein the processor, the memory, and the computer program code are further configured to cause the access node to:
monitor information on terminal devices using the low latency communication services, information to monitor including a number of the terminal devices and their properties; and
update, based on the information, a size of resources allocated to the resource pool.

17. A terminal device comprising:
at least one processor, and
at least one memory comprising a computer program code, wherein the processor, the memory, and the computer program code are configured to cause the terminal device to perform at least one of the following:
send, in response to not receiving a response to a scheduling request sent by the terminal device on a channel allocated for transmissions of scheduling requests for low latency communication services within a predetermined time, data in a contention based manner over a resource pool allocated for contention based transmissions of the low latency communication services;
stop, in response to receiving when using for transmissions of a data service resources on the resource pool, from an access node providing the resource pool, an instruction to stop the use of the resource pool to transmissions of the data service, the use of the resource pool to transmissions of the data service, and send again, in response to one of a lapse of a predetermined time and receiving from the access node a permission to continue the use of the resource pool, transmissions of the data service using the resource pool.

18. A terminal device as claimed in claim 17, wherein the processor, the memory, and the computer program code are further configured to cause the terminal device to receive information on the resource pool over a broadcast from the access node and/or in information sent separately to the terminal device from the access node.

19. An access node comprising means for carrying out the method according to claim 1.

20. A non-transitory computer readable media having stored thereon instructions that, when executed by a computing device, cause the computing device to send, in response to not being able to decode terminal device identification information from a sensed scheduling request from a terminal device on a channel allocated for transmissions of scheduling requests for a low latency communication service, to one or more terminal devices, which are using a resource pool allocated for contention based transmissions of low latency communication services to transmissions of data services, an instruction to stop use of the resource pool.

21. A non-transitory computer readable media as claimed in claim 20, having stored thereon further instructions that, when executed by a computing device, cause the computing device further to send to the one or more terminal devices a permission to use again the resource pool to transmissions of the data services.

22. A non-transitory computer readable media as claimed in claim 20, having stored thereon further instructions that, when executed by a computing device, cause the computing device further to:
broadcast at certain intervals information on the channel allocated for transmissions of scheduling requests for low latency communication services; and
send information on the resource pool separately to each terminal using a low latency service.

23. A non-transitory computer readable media as claimed in claim 20, having stored thereon further instructions that, when executed by a computing device, cause the computing device further to broadcast at certain intervals information on the channel allocated for transmissions request for low latency communication services and information on the resource pool.

24. A non-transitory computer readable media as claimed in claim 20, having stored thereon further instructions that, when executed by a computing device, cause the computing device further to:
monitor information on terminal devices using the low latency communication services, information to monitor including a number of the terminal devices and their properties; and
update, based on the information, a size of resources allocated to the resource pool.

* * * * *